United States Patent [19]

Spickler

[11] Patent Number: 5,599,037
[45] Date of Patent: Feb. 4, 1997

[54] GOLF BAG HOLDER

[76] Inventor: Christian D. Spickler, 4009 Meadowood Dr., Eau Claire, Wis. 54701

[21] Appl. No.: 406,123

[22] Filed: Mar. 17, 1995

[51] Int. Cl.⁶ .................................................. B62B 1/12
[52] U.S. Cl. .................. 280/652; 280/655; 280/43.1; 280/47.26
[58] Field of Search ..................... 280/641, 645, 280/652, 655, 655.1, 47.24, 47.26, 47.315, DIG. 5, DIG. 6, 431

[56] References Cited

U.S. PATENT DOCUMENTS

| 3,162,361 | 12/1964 | Brighton et al. | 280/47.26 |
| 3,784,138 | 2/1974 | Herling et al. | 248/96 |
| 4,355,746 | 10/1982 | Casady | 224/274 |
| 5,088,835 | 2/1992 | Taylor et al. | 224/274 |
| 5,096,059 | 3/1992 | Henderson | 206/315.5 |
| 5,269,410 | 12/1993 | Abregano | 206/315.5 |
| 5,478,097 | 12/1995 | Forma | 280/47.26 |

Primary Examiner—Richard M. Camby
Attorney, Agent, or Firm—John D. Gugliotta; David L. Volk

[57] ABSTRACT

A golf bag holder is provided that can be used in addition to standard golf bags or in addition to the use of golf carts. A wide, flat, flared base is provide to a stable, useable vertical holding position for the golfer to place the golf bag holder on a variety of different terrains without worrying about the golf bag tipping over. The golf bag holder is used by placing a standard golf bag in it and securing it with adjustable hook and loop fastener straps. By providing a plurality of useful storage compartments on the exterior of the golf bag holder, the need for access to the storage areas of the golf bag is eliminated. These storage compartments include a scorecard holder, an umbrella holder, a pocket for holding golf tees, a windowed golf ball holder, a cup holder, and a can holder with contacting cooling medium (which allows for chilled beverage cans to accompany the user). Also, retractable wheels and a foldable handle permit the user to easily transport the golf bag holder along a golf course.

15 Claims, 9 Drawing Sheets

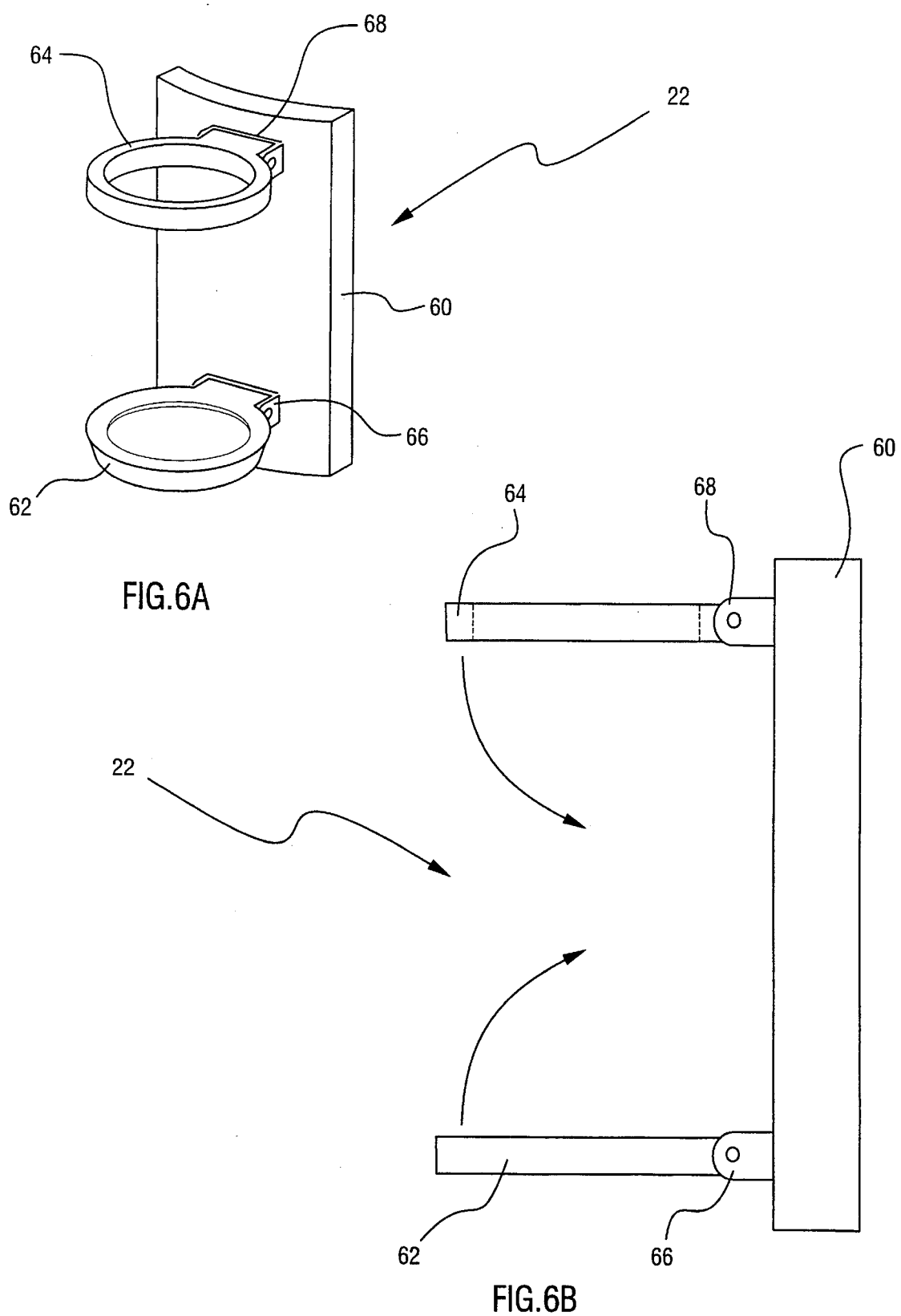

GOLF BAG HOLDER

BACKGROUND OF THE INVENTION

1. Field of the Invention

The present invention relates generally to golf equipment and, more particularly, to golf bag holders.

2. Description of the Related Art

In the related art, a number of useful improvements have been developed to address the dual problems of carrying golf bags and accessing golf accessories from the pockets and compartments of golf bags. However, the related art tends to disclose solutions generally to one problem or the other, but not both.

The first problem, that of carrying a golf bag, has been approached in several different manners. In U.S. Pat. No. 4,355,746 issued in the name of Casady discloses a golf bag holder for use with golf carts. The Casady invention is composed of a plurality of vertical arms that each attach to a golf bag. The arms which pivot downward and outward to that of the attached golf bags, with its bottom resting on the golf cart, will be held out at an angle so that the user is able to easily select and retrieve her clubs. The invention is an improvement over other known existing golf bag holders for golf carts in that up to four bags can be held utilizing a minimum amount of space, and the golf bags can be stored upright or retracted outward, essentially allowing for two different positions.

Another approach to solving the problem of carrying a golf bag on a golf cart is disclosed in U.S. Pat. No. 5,088,835 issued in the name of Taylor et al. In Taylor et al. a golf bag rack is disclosed which provides a mounting base and bag support members which are mounted on the upper surface of each rear fender of a conventional motor-driven golf car. Utilized in conjunction with the normally provided golf bag carrying means, the Taylor et al. invention increases the golf bag carrying capacity of a conventional golf cart from two to four golf bags.

Another problem occurs in carrying a golf bag when a golf cart is not being utilized. In U.S. Pat. No. 3,784,138 issued in the name of Herling et al., a rotatable golf bag holder is disclosed. In solving problems created by other holders that firmly strap or clamp a golf bag into a fixed position, the Hering et al. invention comprises a base and a rotatable ring assembly which encircles and clamps the top of the golf bag, permitting full 360 degree rotation of the holder and bag to provide easy access to the ball and accessory pockets thereof. The Herling et al. invention also discloses arrangements for use on a conventional motorized golf cart.

The above mentioned art attempted to aid the user in carrying a golf bag while not interfering with access to the storage compartments provided as part of a standard golf bag. Several other attempts within the related art are attempts to make the storage compartments themselves more accessible and thereby not to interfe with the means for carrying the golf bag. In U.S. Pat. No. 5,269,410 issued in the name of Abregano, a golf accessory organizer is disclosed. The Abregano invention is a rectangular shaped portfolio with a spring clip for removably attaching an upper short side of the portfolio to a top cuff of a golf bag. A hook and loop fabric fastener strip is for removably retaining the portfolio in a closed position, and an elastic band is affixed to an inner surface of the portfolio for holding, in a neatly organized manner, a plurality of tees and a divot fixer and ball marker. A closeable pouch is also provided for storing other small supplies and items.

Also, in U.S. Pat. No. 5,096,059 issued in the name of Henderson, an accessory saddle member for a golf bag is disclosed. The Henderson invention provides an aperture for receiving the handle of the golf bag, and straps around the upper portion of the golf bag and includes closable pockets for carrying golf related and personal items.

Consequently, a need has been felt for providing an apparatus which overcomes the problem of carrying a golf bag while still providing access to accessories and supplies that are required from time to time during the game of golf.

SUMMARY OF THE INVENTION

It is therefore an object of the present invention to provide an improved golf bag holder that prevents the need to lay a golf bag on the ground.

It is a further object of the present invention to provide an improved golf bag holder that can eliminate the need to lift the golf bag.

It is a further object of the present invention to provide an improved golf bag holder that can eliminate the need to lift the golf bag, but yet still provide a means for manually carrying the golf bag.

It is a further object of the present invention to provide an improved golf bag holder that can provide sufficient and convenient storage for score cards, tees, golf balls, and other similar supplies.

It is a further object of the present invention to provide an improved golf bag holder that can adjust to different sided golf bags.

It is a further object of the present invention to provide an improved golf bag holder that is stable over a variety of terrain.

It is a further object of the present invention to provide an improved golf bag holder that provides a can holder which allows the golfer to take soda or water with them on the golf course without having to carry an extra cooler or backpack.

Briefly described according to one embodiment of the present invention, a golf bag holder is provided that can be used in addition to standard golf bags or in addition to the use of golf carts. A wide, flat, flared base provides a stable, useable vertical holding position for the golfer to place the golf bag holder on a variety of different terrains without worrying about the golf bag tipping over. The golf bag holder is used by placing a standard golf bag in it and securing it with adjustable VELCRO straps. By providing a plurality of useful storage compartments on the exterior of the golf bag holder, the need for access to the storage areas of the golf bag is eliminated. These storage compartments include a scorecard holder, an umbrella holder, a pocket for holding golf tees, a windowed golf ball holder, a cup holder, and a can holder with contacting cooling medium (which allows for chilled beverage cans to accompany the user). Also, retractable wheels and a foldable handle allow the user to easily transport the golf bag holder along a golf course.

An advantage of the present invention is that a golf bag can be supported upright while providing a stable base that will prevent tipping on a wide range of terrains.

Another advantage of the present invention is that a variety of different sized golf bags can be accommodated.

Another advantage of the present invention is that a large number of accessory storage areas, including a cup holder, umbrella holder, sun glasses holder, ice pack and can holder, cleat shoe brush, golf ball holder, score card and pencil holder, and tee holder are incorporated into the present invention, thereby eliminating the need to even use or access the storage areas supplied with most standard golf bags.

Further, a preferred embodiment of the present invention has pull-down wheels and a fold out pull handle for easy pulling and transporting of a golf bag.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6A is an orthographic view of the cup holer for the golf bag holder according to the preferred embodiment of the present invention; FIG. 6B is a side view of the cup holer for the golf bag holder according to the preferred embodiment of the present invention.

DESCRIPTION OF THE PREFERRED EMBODIMENTS

1. Detailed Description of the Figures.

Figure 1A:
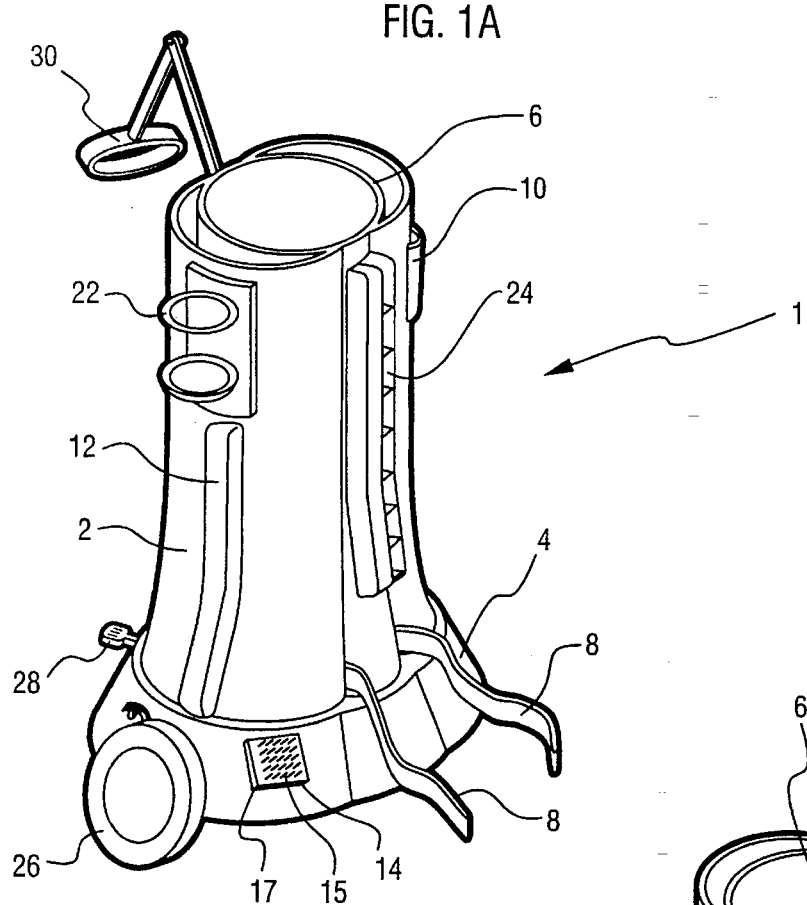
FIG. 1A is an orthographic view of the golf bag holder according to the preferred embodiment of the present invention, as viewed from its left side.
Figure 1B:
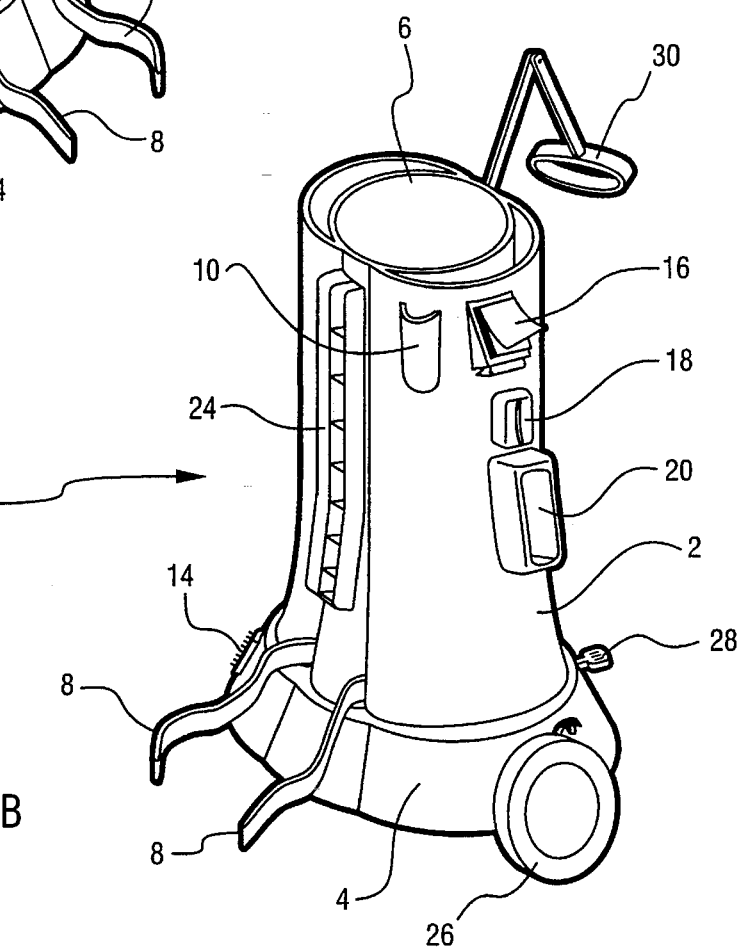
FIG. 1B is an orthographic view of the golf bag holder according to the preferred embodiment of the present invention, as viewed from its right side.

Referring now to FIG. 1A and FIG. 1B, a golf bag holder 1 is shown, according to the present invention, comprising two rigid, vertical side supports 2 mounted on and generally perpendicular to a wide, flared base 4. The vertical side supports 2 form a slotted, hollow tube-like support structure that is utilized to contain any standard golf bag 6. Two hook and loop fastener material strips 8, such as VELCRO(R) brand strips, for example, are affixed to the inside of the side supports 2, and are used to encircle, grip, and hold any standard golf bag 6. The hook and loop fastener material strips 8 are of sufficient length to accommodate a variety of different sized golf bags 6.

Although a variety of different materials may be used, it is envisioned that the wide, flared base 4 and the vertical side supports 2 are made of injected molded plastic, which will accommodate the support and attachment of a variety of storage compartments and holders. Although a number of different combinations are possible, the preferred embodiment of the present invention provides a sun glasses holder 10, an umbrella holder 12, a cleat shoe brush 14, a score card holder 16, a golf tee holder 18, a windowed golf ball holder 20, a foldable cup holder 22, and a can holder 24.

The sun glasses holder 10 comprises an open topped pocket, sized and shaped to accommodate a pair of sunglasses, molded into or attached to the wall of the side support 2.

The umbrella holder 12 comprises a long enclosed channel, with open top and bottom, of sufficient open diameter to accommodate a folded umbrella and molded into or attached to the wall of the side support 2.

The cleat shoe brush 14 comprises a plurality of straight, stiff, metal teeth 15 mounted on a back plate 17. The back plate 17 is either molded into or attached to the base 2.

The golf tee holder 18 comprises a reclosable pocket structure attached to the wall of the side support 2. The use of conventional methods of containing golf tees are currently envisioned for use with the preferred embodiment of the present invention.

By providing this unique combination in a non-obvious manner, the need to access any storage compartments of the standard golf bag 6 is eliminated. The golf bag holder 1 according to the preferred embodiment of the present invention also contains retractable wheels 26 adjusted by a foot lever 28, and a fold out handle 30 for easy pulling of the golf bag holder 1.

Figure 2A:
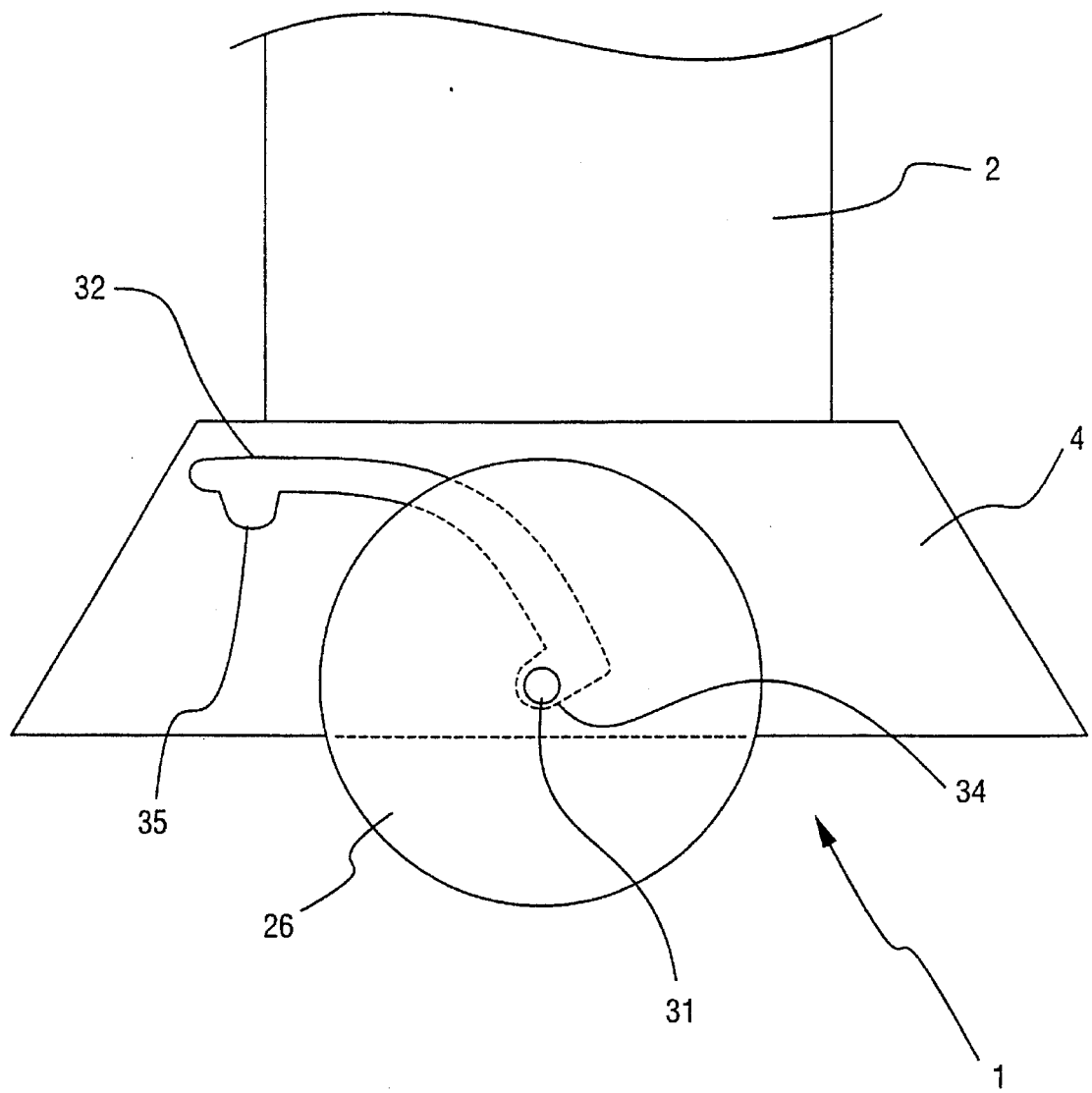
FIG. 2A is a side view of the lower section of the golf bag holder according to the preferred embodiment of the present invention with the wheels in their lower, extended position.
Figure 2B:
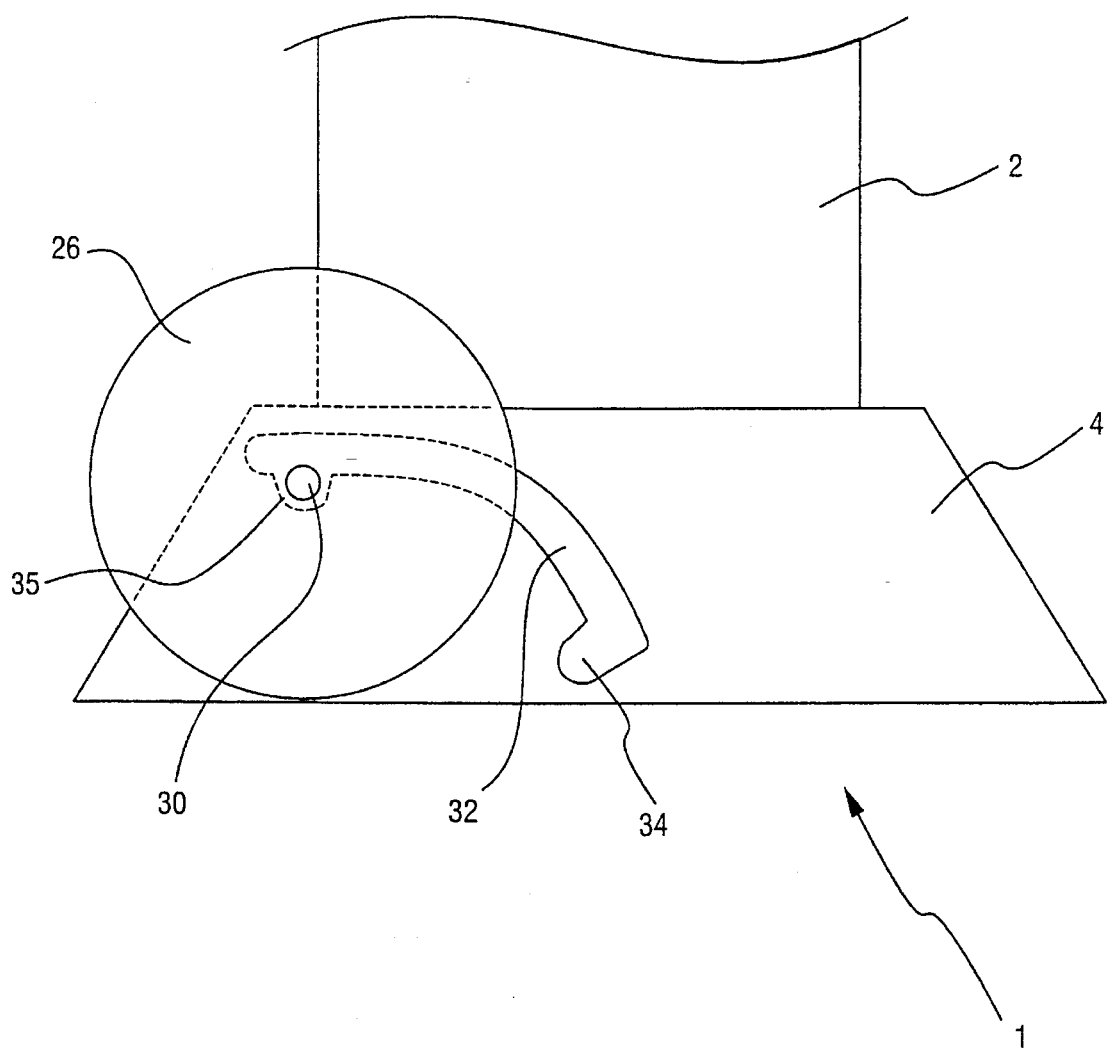
FIG. 2B is a side view of the lower section of the golf bag holder according to the preferred embodiment of the present invention with wheels in their upper, retracted position.
Figure 2C:
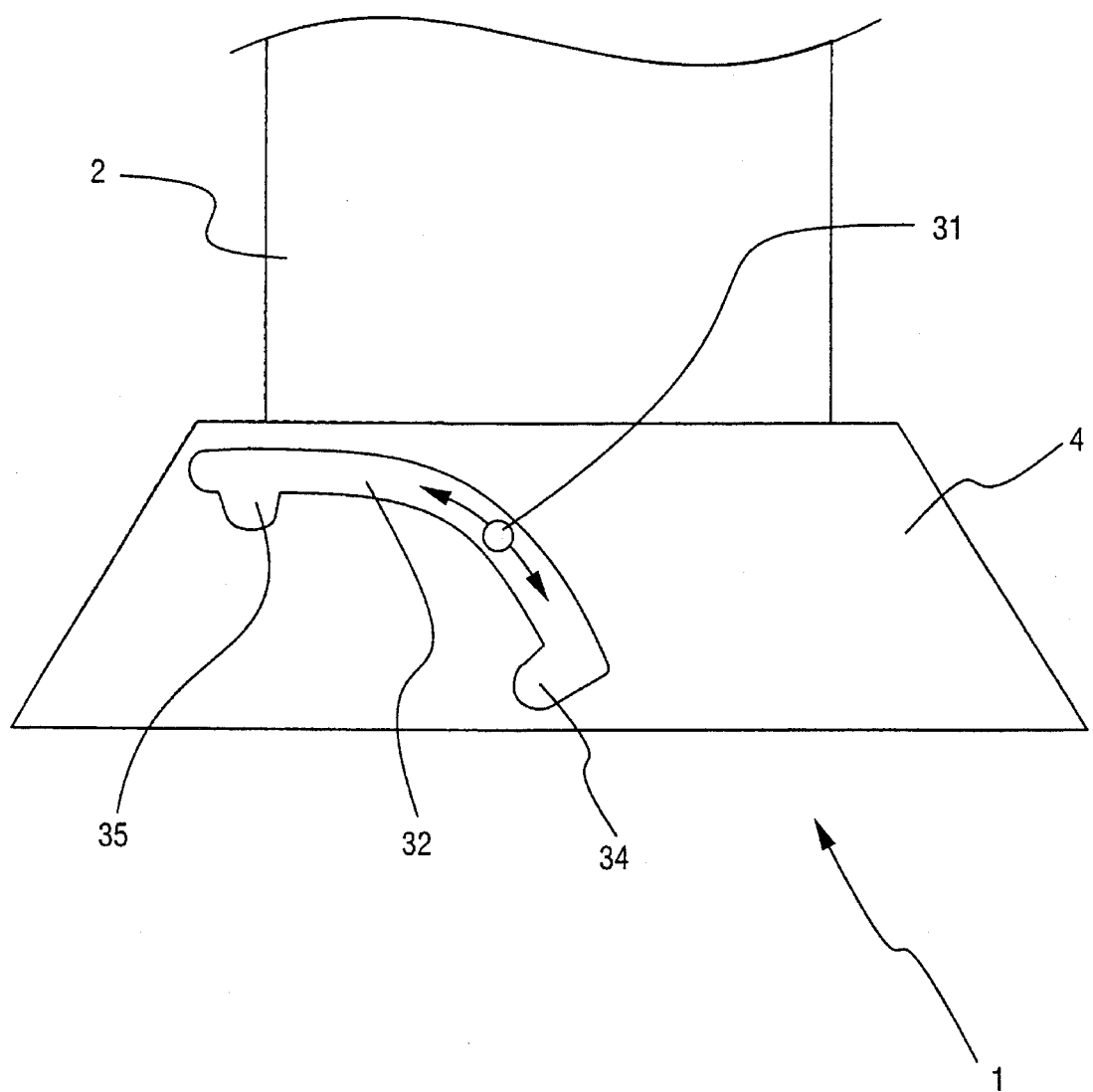
FIG. 2C is a view of the wheel attachment lower section of the golf bag holder with the wheels removed according to the preferred embodiment of the present invention.

Referring to FIG. 2A, FIG. 2B, and FIG. 2C, the arrangement of the wheels 26 with respect to the base 4 is disclosed in further detail. In FIG. 2A the wheels 26 are shown in their extended position, wherein the lower portion extends below the bottom of the base 4. The base 4 is penetrated by freely rolling axle 31 that permit the golf bag holder 1 to be easily transported by rolling. In FIG. 2B, the wheels 26 are shown in their retracted position, wherein the lower portion of the wheels do not extend below the bottom of the base 4. In this retracted position, the base 4 can sit firmly and securely on the ground. The means for creating this extension-retraction characteristic is shown in FIG. 2C. A channel 32 is formed within the side of the base 4 which supports and guides the axle 31 into each position. The channel 32 is arc shaped, and has a lower retaining notch 34 and an upper retaining notch 35, one at each extreme corresponding to the fully extended and fully retracted position. The axle 30 rests in the lower notch 34 to support the axle when the wheels 26 are in their extended position. The axle 30 is then guided along the channel 32 to the upper notch 35, where it is supported when the wheels 26 are in their retracted position.

Figure 3:
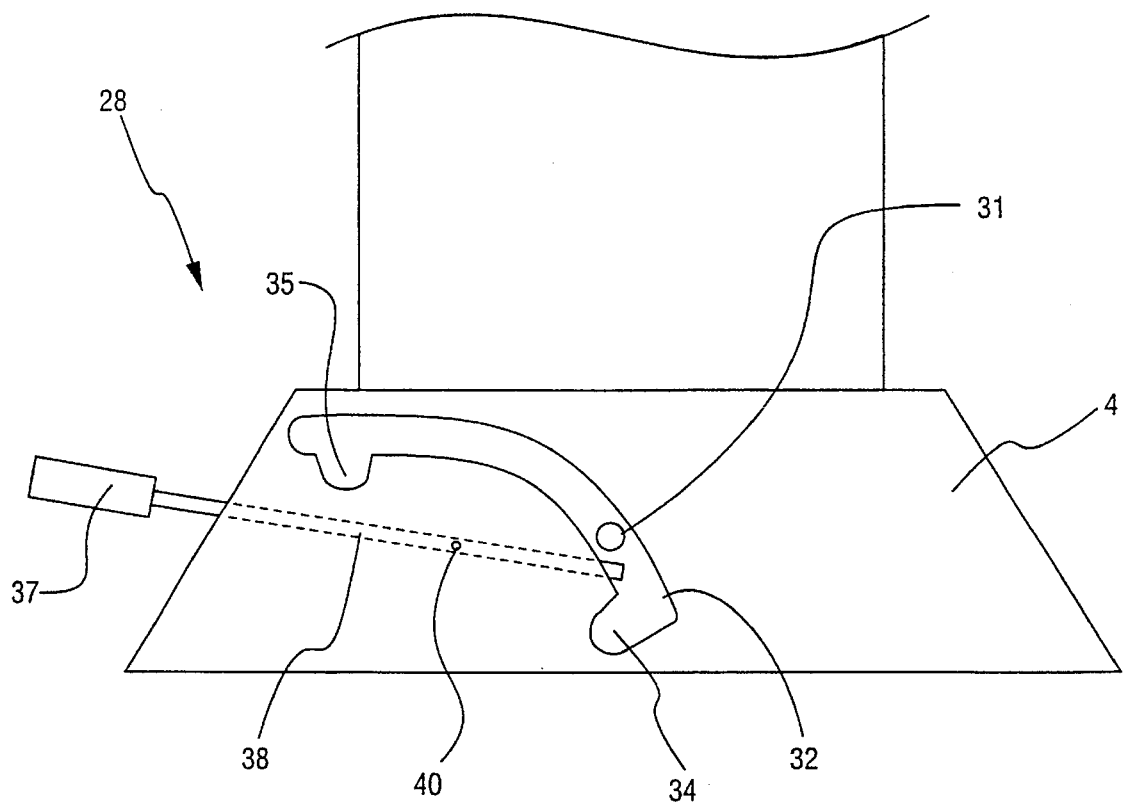
FIG. 3 is a detailed side view of the axle foot lever for the golf bag holder according to the preferred embodiment of the present invention.

FIG. 3 shows the mechanism by which the foot lever 28 accomplishes the movement of the axle 31 along the channel 32. The fool lever 28 comprises a pedal 37, an arm 38, and a fulcrum 40. The fulcrum 40 is located at the arc center of the channel 32 and pivotally attaches the arm 38 to the base 4. The arm 38 is in contact with the axle 31, and by depressing the pedal 37 the user can move the arm 38 about the fulcrum 40 and thereby lift the axle 31 from its extended position, resting at the bottom of the channel 32 in the lower retaining notch 34, to its retracted position, resting at the top of the channel 32 in the upper retaining notch 35.

Figure 4:
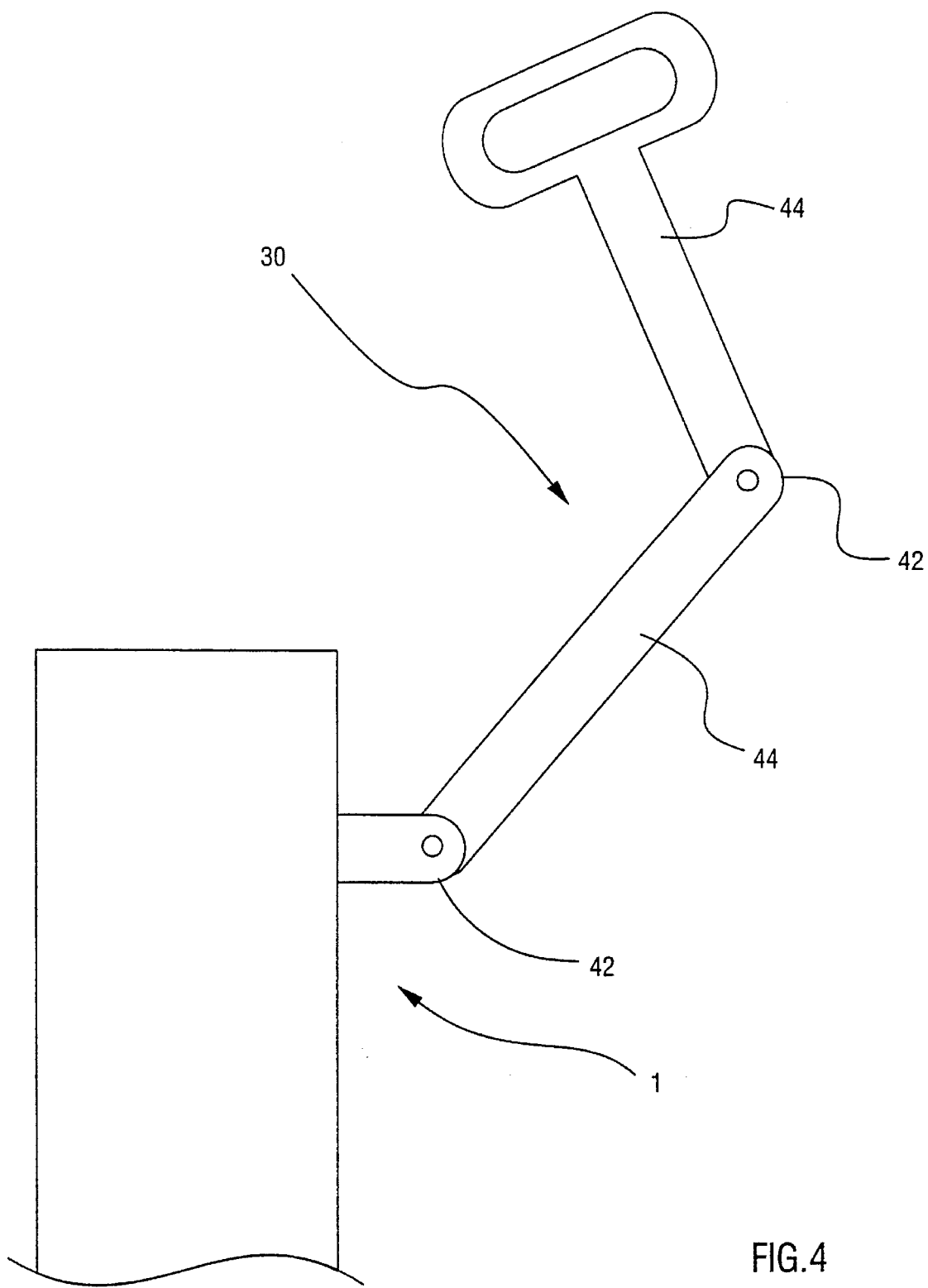
FIG. 4 is a side view of the pull handle for the golf bag holder according to the preferred embodiment of the present invention.

In FIG. 4, a foldable handle 30 is depicted according to the present invention, pivotally attached to the upper portion of the golf bag holder 1. In utilizing a pair of locking hinges 42, the arm segments 44 can be folded for storage, or extended for pulling the golf bag holder 1 when the wheels are in their extended position.

Figure 5A:
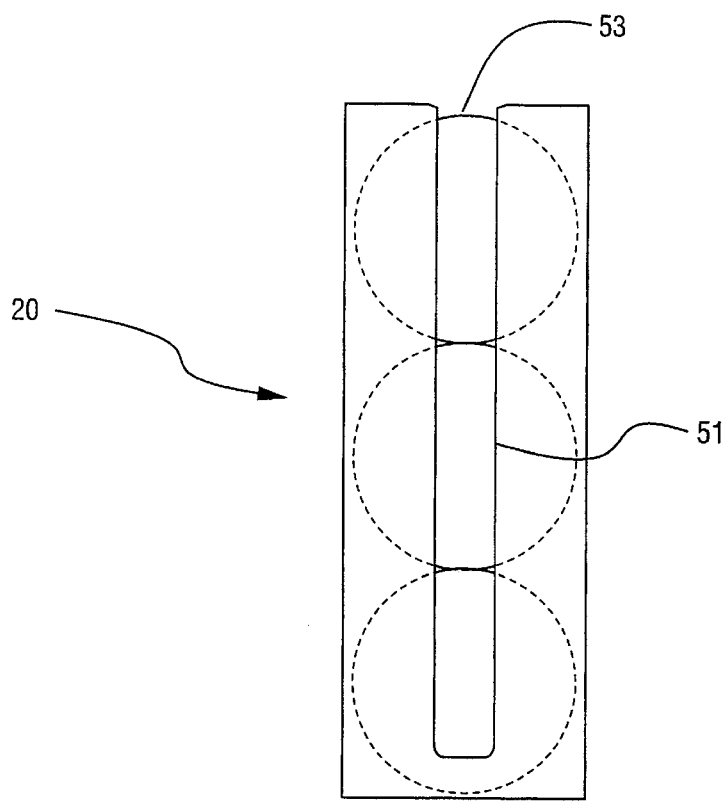
FIG. 5A is a front view of the golf ball holder for the golf bag holder according to the preferred embodiment of the present invention.

In FIG. 5A, a golf ball holder 20 is depicted. According to the present invention it is envisioned that the golf ball holder 20 will be molded as a part of or attached to the side support of the golf bag holder. According to the preferred embodiment of the present invention, the golf ball holder 20 is comprised essentially of a pocket shaped container area, but having a window 51 and an upper opening 53. The upper opening 53 is for access to and removal of golf balls from the golf ball holder 20. To be effective, the window 51 consists of an open slot in the front of the golf ball holder 20 whose widest horizontal dimension is less than the diameter of a regulation sized golfball.

Figure 5B:
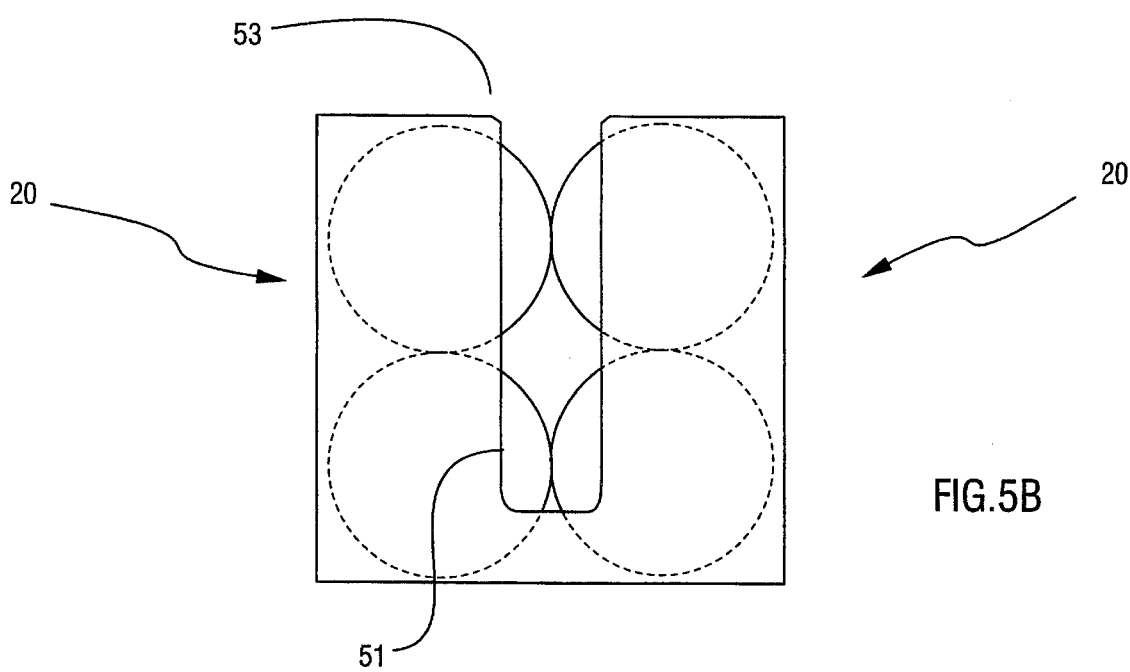
FIG. 5B is a front view of an alternate design for the golf ball holder for the golf bag holder according to the preferred embodiment of the present invention.

In FIG. 5B, an alternate design of the preferred embodiment of the golf ball holder 1 is depicted. According to this embodiment the golf ball holder 20 will be molded as a part of or attached to the side support of the golf bag holder. According to this embodiment, the golfball holder 20 is also comprised essentially of a pocket shaped container area, also with a window 51 and an upper opening 53. The upper opening 53 is for access to and removal of golf balls from the golf ball holder 20. To be effective, the window 51 consists of an open slot in the front of the golf ball holder 20 whose widest horizontal dimension is less than the diameter of a regulation sized golfball.

In FIG. 6A and FIG. 6B, a cup holder 22 is shown as used with the preferred embodiment of the present invention. The cup holder 22 comprises a backplate 60, a lower support platform 62, and an upper retaining ring 64. The lower support platform 62 is attached to the backplate 60 via an upwardly foldable lower hinge 66. The upper retaining ring 64 is attached to the backplate 60 via a downwardly foldable upper hinge 68. According to the preferred embodiment of the present invention, it is envisioned that the backplate 60 will be molded as a part of or attached to the vertical side support 2 (refer to FIG. 1A and FIG. 1B).

Figure 7:
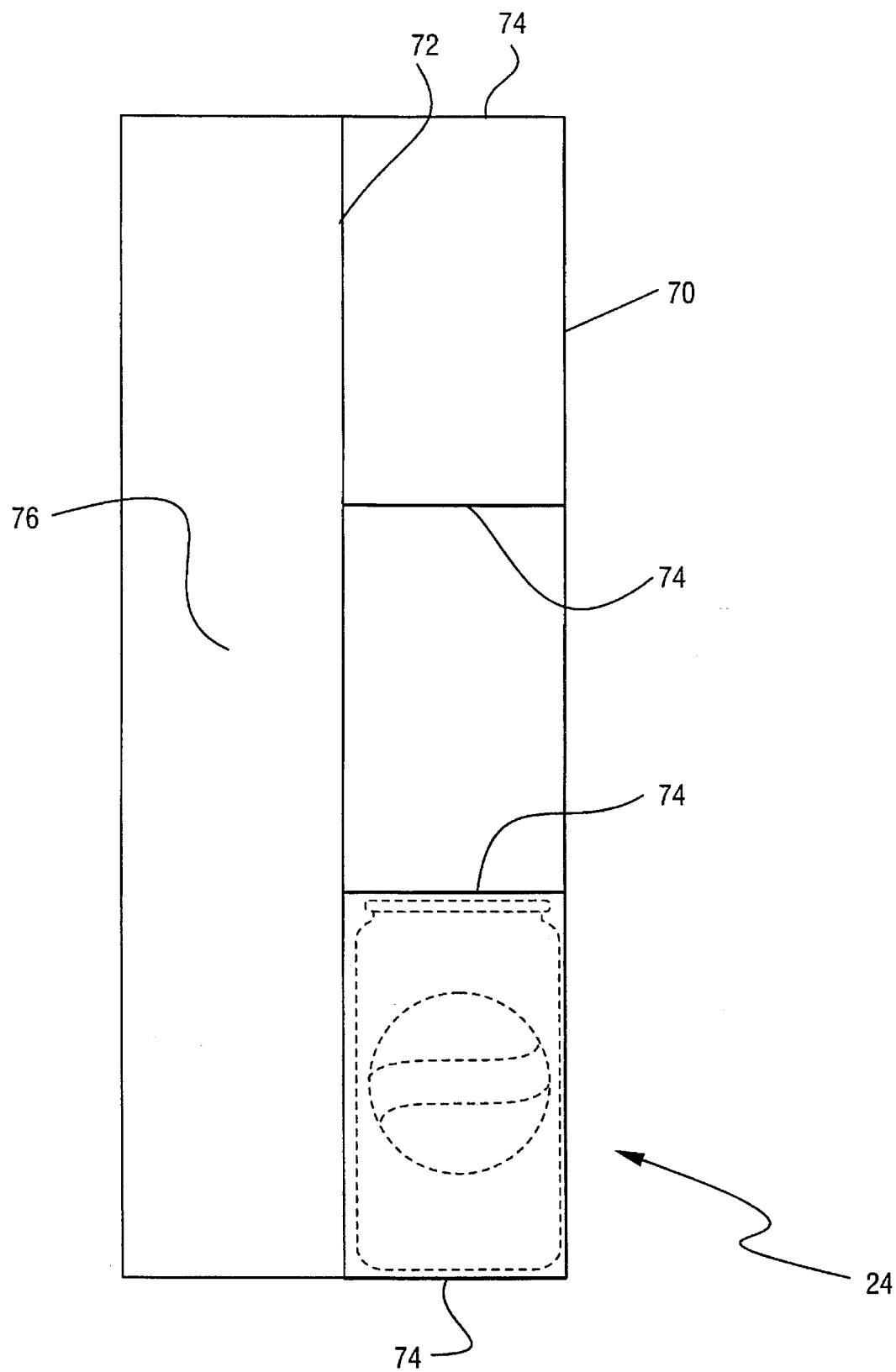
FIG. 7 is a front view of the can holder for the golf bag holder according to the preferred embodiment of the present invention.

Finally, in FIG. 7 a can holder 24 is depicted according to the preferred embodiment of the present invention. The can holder 24 is comprised of an outer side wall 70 generally parallel to an inner side wall 72. The outer side wall 70 and inner side wall 72 are connected by a plurality of perpendicular can dividers 74. The inner side wall 72 is in direct thermal contact with an ice pack 76. The ice pack 76 is removable and reusable to facilitate re-freezing. In this configuration, a soda can can be inserted into the chamber created by the outer side wall 70, inner side wall 72, and perpendicular can dividers 74 to prevent the can from unwanted movement. Also, in this configuration the soda can within the chamber is in direct thermal contact with the ice pack 76, and therefore remains cold.

2. Operation of the Preferred Embodiment

Referring generally to FIG. 1, to use the present invention, the golfer inserts the golf bag 6 into the golf bag holding device 1 between the side supports 2. The hook and loop faster material strips 8 are pulled securely around the golf bag 6 and connected to firmly hold a variety of different sized golf bags within the golf bag holder 1.

The user will then, if desired: place golf balls within the golf ball holder 20; place golf tees in the tee holder 18; place a score card and pencil in the score card holder 16; place sun glasses in the sun glasses holder 10; place an umbrella in the umbrella holder 12; place the ice pack and an soda cans in the can holder 24. The user will extend the wheels 26 with the foot lever 28 and extend the handle 30 in order to easily wheel around the user's golf bag. When the user is required to execute a golf shot, the wheels are retracted to allow the flat base 4 to rest steadily over a wide variety of terrain. Because of the numerous storage compartments built into the present invention, the user will not need to access the storage compartments that are part of the golf bag 6.

The foregoing description is included to illustrate the operation of the preferred embodiment and is not meant to limit the scope of the invention. Many variations will be apparent to those skilled in the art that would yet be encompassed by the spirit and scope of the invention. The scope of the invention is to be limited only by the following claims.

What is claimed is:

1. A golf bag holder for removably holding and carrying a standard golf bag, said golf bag holder comprising:

a wide, flared, rigid base, said base being generally flat along the bottom surface;

a plurality of vertically elongated rigid side supports in contact with the upper surface of said base;

adjustable retaining means for fittingly holding a golf bag within the confines of the side supports;

a pair of wheels mounted on each end of a long, rod-like axle, said axle penetrating said base and extending beyond said base at each side;

retraction means for extending said wheels below the fiat bottom surface of said base and retracting said wheels above the flat bottom surface of said base; and a handle pivotally attached to one of said vertical side support.

2. The golf bag holder according to claim 1, further comprising a shoe cleaning means for cleaning he bottom of cleated shoes affixed to said base.

3. The golf bag holder according to claim 1, further comprising a plurality of sundry storage compartments affixed to said side supports comprising the combination of:

a score card holder, said score card holder being of the clip-type currently in common use;

a sun glasses holder, said sun glasses holder comprising a hollow pocket shaped recess with an opening at the top to receive a pair of sun glasses;

a closable pocket for containing golf ball tees;

an umbrella holder, said umbrella holder comprising an open ended hollow tube mounted vertically for receiving and retaining a folded umbrella;

golf ball holding means for removably containing a plurality of golf balls;

cup holding means for removably containing a drinking cup; and can holding means for removably containing a plurality of beverage cans.

4. The golf bag holder according to claim 1, wherein said adjustable retaining means for fittingly holding a golf bag within the confines of the side supports comprises a pair of elongated strips of hook and loop fastener material, said strips being affixed at one end to the inside surface of a vertical side support, and said strips being of sufficient length to surround the outer diameter of a standard golf bag.

5. The golf bag holder according to claim 1, wherein said retraction means for extending said wheels below the flat bottom surface of said base and retracting said wheels above said flat bottom surface of said base comprises:

a pedal extending out from the side of said base;

an elongated arm, one end connected to said pedal and the other end in contact with said axle;

a channel, said channel comprising an arc-shaped void within said base, through said channel which said axle penetrates and rests rotatably within; and a fulcrum, located between said pedal and said axle, in contact with said arm, about which said arm rotates, such that when pressure is applied to said pedal such pressure is communicated through said arm about said fulcrum such that said axle is moved along said channel, thereby extending or retracting said wheels.

6. The golf bag holder according to claim 1, wherein said handle comprises:

two elongated arm segments;

a lower pivoting locking hinge connecting one said arm segment with said vertical side support;

an upper pivoting locking hinge connected each arm segment end to end; and a grippable member connected to the distal end of one said arm segment not in connection with said vertical side support.

7. The golf bag holder according to claim 1, wherein said shoe cleaning means for cleaning the bottom of cleated shoes comprises:

back plate in connection with said base; and b) an array of a plurality of straight, stiff metal teeth mounted on said back plate and extending outward from said backplate.

8. The golf bag holder according to claim 1, further comprising a shoe cleaning means for cleaning he bottom of cleated shoes wherein said shoe cleaning means comprises an array of a plurality of straight, stiff metal teeth mounted directly on said base extending outward from said base.

9. The golf bag holder according to claim 1, further comprising a golf ball holding means for removably containing a plurality of golf balls, wherein said golf ball holding means comprises:

a pocket shaped container area with two sides, a bottom, a front, and a back surface;

an upper opening for placing and removing golf balls within the confines of said pocket shaped container area; and a slotted window along the length of and defined by the front of the pocket shaped container area, said window having a width less that the diameter of a golf ball, for visually indicating the quantity of contents contained within said golf ball holding means.

10. The golf bag holder according to claim 1, further comprising a cup holding means wherein said cup holding means is foldable into a flat position when not being utilized, and comprises:

a back plate;

an upwardly foldable lower hinge;

a lower support platform, said lower support platform being connected to said back plate via said upwardly foldable lower hinged such that said lower support platform folds up flat against said backplate for storage, and said lower support platform can be extended rigidly to a position perpendicular to said back plate when being used to support a common drinking cup;

a downwardly foldable upper hinge; and an upper retaining ring, said upper retaining ring being connected to said back plate via said downwardly foldable upper hinge such that said upper retaining ring folds down flat against said backplate for storage, and said upper retaining ring can be extended rigidly to a position perpendicular to said back plate and parallel to said lower support platform when being used to contain a common drinking cup.

11. The golf bag holder according to claim 1, further comprising a can holding means, wherein said can holding means comprises:

an outer wall;

an inner side wall situated generally parallel to said outer wall;

a plurality of can dividers, said can dividers mounted perpendicular to and in connection with said outer wall and said inner wall, and spaced apart such as to form a series of rectangular storage compartments of a size sufficient such that each rectangular storage compartment can removably contain one typical 12 ounce beverage can; and a removable, re-freezable gel-pack type ice pack for providing thermal cooling, said ice pack being in direct thermal contact with said inner side wall.

12. The golf bag holder according to claim 1, wherein said base and said side supports are molded as one piece and are composed of injected molded plastic material.

13. The golf bag holder according to claim 1, wherein said side supports are manufactured with a decorative pattern of a generally white background with large, irregularly shaped black spots such as to emulate a cowskin pattern.

14. A golf bag holder for removably holding and carrying a standard golf bag, said golf bag holder comprising:

a wide, flared, rigid base, said base being generally flat along the bottom surface;

a plurality of vertically elongated rigid side supports in contact with the upper surface of said base;

a cavity for holding a standard golf bag, said cavity having an opening on top and formed on the sides by aid plurality of side supports and on the bottom by said base a pair of wheels mounted on each end of a long, rod-like axle, said axle penetrating said base and extending beyond said base at each side;

retraction means for extending said wheels below the flat bottom surface of said base and retracting said wheels above the flat bottom surface of said base; and a handle attached to said vertical side support.

15. A golf bag holder for removably holding and carrying a standard golf bag, said golf bag holder comprising:

a wide, flared, rigid base, said base being generally flat along the bottom surface:

a plurality of vertically elongated rigid side supports in contact with the upper surface of said base; and a cavity for holding a standard golf bag, said cavity having an opening on top and formed on the sides by said plurality of side supports and on the bottom by said base; and wherein said base and said side supports are molded as one piece and are composed of injected molded plastic material.

\* \* \* \* \*